United States Patent Office 2,994,708
Patented Aug. 1, 1961

2,994,708
3β,17β-DIALKOXY-5-ANDROSTEN-16-OLS
Max N. Huffman, Colorado Springs, Colo., assignor to Lasdon Foundation, Inc., Yonkers, N.Y., a corporation of Delaware
No Drawing. Filed May 18, 1960, Ser. No. 29,802
6 Claims. (Cl. 260—397.5)

This invention relates to 3β,17β-dialkoxy-5-androsten-16-ols, to esters thereof and to methods of preparing the same. More particularly, this invention relates to novel steriods having the following general formula

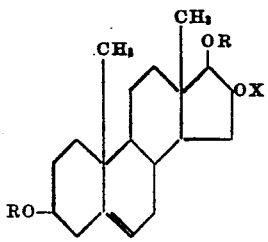

wherein R is a lower alkyl radical containing 1 to 5 carbon atoms and X is hydrogen or an acyl radical containing 1 to 18 carbon atoms.

In the foregoing compounds, the radical R represents alkyl radicals, such as methyl, ethyl, propyl, isopropyl, butyl, secondary butyl, isobutyl, amyl, secondary amyl, isoamyl and diethylmethyl. The acyl radical represented by X includes alkanoyl radicals, such as acetyl, propionyl, butyryl, palmitoyl, stearoyl, oleoyl and the like, as well as aromatic acyl radicals, such as benzoyl, toluyl and naphthoyl.

The compounds of this invention have the important property of depressing the reticuloendothelial system in mammals without exhibiting undesirable androgenic properties of the androgens from which they are derived. They not only depress phagocytic velocity, but they depress the activity of tissues which produce antibodies. The depression of antibody formation is important in relief of allergic and hypersensitivity diseases such as rheumatoid arthritis and in the surgical grafting of heterologous tissues. In these properties, the compounds of this invention resemble cortisone and similar corticoid hormones which depress the reticuloendothelial system and are used to prevent antibody reactions in tissue grafting and thereby avoid inflammatory reactions.

It is an object of this invention to provide novel 3β,17β-dialkoxy-5-androsten-16-ols and simple and efficient methods of preparing the same. It is a further object to provide new steroids having useful properties of depressing the reticuloendothelial system and suppressing allergic and hypersensitivity reactions in mammals. These and other objects are apparent from and are achieved in accordance with the following disclosure.

The compounds of this invention can be produced from dialkyl ethers of 5-androsten-3β,17β-diol-16-one which are described in my copending application Serial No. 27,962, filed May 9, 1960. 3β,17β-dialkoxy-5-androsten-16-one, when reduced with an alkali metal hydride of a metal of group IIIa of the periodic table, produces the corresponding 16β-hydroxy steroid. The latter can be purified by conversion to an ester with a lower alkanoic acid such as by acetylation with acetic anhydride in a tertiary amine solvent to the 16-acetate which can subsequently be hydrolyzed to produce the pure 3β,17β-dialkoxy-5-androsten-16β-ol. The corresponding epimer, namely, the 16α-hydroxy compound, can be produced from the same starting material, namely, 3β,17β-dialkoxy-5-androsten-16-one by reduction with an alkali metal and a lower alkanol containing 1 to 5 carbon atoms, such as sodium and propanol. The product can be purified through its acetate or similar lower alkanoate and the latter hydrolyzed to produce 3β,17β-dialkoxy-5-androsten-16α-ol.

The invention is disclosed in further detail by means of the following examples which are provided for purposes of illustration only and which are not to be construed as limiting the invention in scope. It will be understood by those skilled in the art that numerous modifications in synthetic procedures may be adopted without departing from this invention subject to the use of equivalent solvents, reagents, conditions and starting materials.

Example 1

3β,17β-dimethoxy-5-androsten-16β-ol was produced from 3β,17β-dimethoxy-5-androsten-16-one by dissolving 1.5 grams of the latter in 150 ml. of absolute ethanol. The solution was cooled to 0° C., 1.2 grams of sodium borohydride were added and the mixture kept at 0° C. for 3 hours and then for 1 hour at 22° C. Thereafter, 1700 ml. of cold 5% sodium chloride solution containing 15 ml. of acetone was added and the mixture refrigerated at 0° C. for 15 hours. The precipitate of 3β,17β-dimethoxy-5-androsten-16β-ol which formed was collected on a filter and dried. It was purified by acetylation, by dissolving the steroid in 20 ml. of dry pyridine containing 15 ml. of acetic anhydride and allowing the mixture to stand at 25° C. for 24 hours. Then 800 ml. of ice water was added and the mixture refrigerated for about 15 hours, during which time a precipitate of 3β,17β-dimethoxy-5-androsten-16β-ol acetate formed. The precipitate of the latter was removed, dried and recrystallized from 75% methanol with the aid of activated carbon. 3β,17β-dimethoxy-5-androsten-16β-ol acetate thus prepared melted at 121.5–122° C.

1.2 grams of the 3β,17β-dimethoxy-5-androsten-16β-ol acetate was dissolved in 85 ml. of 80% methanol containing 1.19 grams of sodium hydroxide. The reaction solution was refluxed for 1 hour, and was evaporated by distillation at atmospheric pressure until precipitation of the steroid began. The mixture was then stored at 0° C. for 15 hours. The precipitate of 3β,17β-dimethoxy-5-androsten-16β-ol, which had formed, was removed by filtration, dried, and recrystallized from 85% methanol. The 3β,17β-dimethoxy-5-androsten-16β-ol prepared in this manner melted at 164–165° C.

Example 2

3β,17β-dimethoxy-5-androsten-16α-ol was prepared by dissolving 1.0 gram of 3β,17β-dimethoxy-5-androsten-16-one in 75 ml. of anhydrous n-propyl alcohol and 25 ml. of absolute ethanol. The solution was refluxed while protected from atmospheric moisture and 5 grams of sodium was added in 0.25 gram portions over a period of 1 hour. The reaction mixture was diluted with 900 ml. of ice water and refrigerated at 0° C. for 15 hours. The precipitate of 3β,17β-dimethoxy-5-androsten-16α-ol which formed was separated and dried. It weighed 880 mg. It was dissolved in 10 ml. of anhydrous pyridine containing 10 ml. of acetic anhydride and the reaction mixture was allowed to stand at room temperature (24° C.) overnight. Then 400 ml. of ice water was added to the reaction mixture and it was stored at 0° C. for 15 hours, during which time a precipitate of 3β,17β-dimethoxy-5-androsten-16α-ol acetate formed. The latter was removed, dried and recrystallized from aqueous 80% methanol with the aid of activated charcoal. 3β,17β-dimethoxy-5-androsten-16α-ol acetate thus obtained melted at 167–167.5° C.

The acetate prepared above was dissolved in 50 ml. of 80% methanol containing 1 gram of sodium hydroxide, the reaction mixture refluxed for 1 hour and then evaporated by distillation at atmospheric pressure until precipitation of steriod began. The mixture was then stored at 0° C. for 15 hours, during which time a precipitate of 3β,17β-dimethoxy - 5 - androsten-16α-ol formed. This precipitate was removed by filtration, dried and recrystallized from 60% methanol. 3β,17β-dimethoxy-5-androsten-16α-ol thus prepared melted at 163–164° C. and formed large glossy plates.

What is claimed as new and is desired to be secured by Letters Patent of the United States is:

1. A compound of the formula

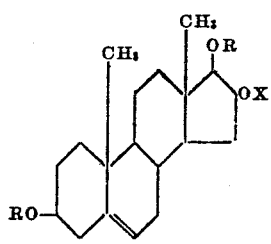

wherein R is a lower alkyl radical containing 1 to 5 carbon atoms and X is a member of the group consisting of hydrogen and hydrocarbon acyl radicals containing 1 to 8 carbon atoms.

2. 3β,17β-dialkoxy-5-androsten-16-ol wherein the alkoxyl radicals contain 1 to 5 carbon atoms.
3. 3β,17β-dimethoxy-5-androsten-16β-ol.
4. 3β,17β-dimethoxy-5-androsten-16α-ol.
5. 3β,17β-dimethoxy-5-androsten-16β-ol acetate.
6. 3β,17β-dimethoxy-5-androsten-16α-ol acetate.

References Cited in the file of this patent

UNITED STATES PATENTS 2,945,048    Huffman _____ July 12, 1960

OTHER REFERENCES

Chaiken et al.: J.A.C.S., vol. 71, pages 122–125 (1949).
Jones et al.: Nature, vol. 181, pages 48–49 (1958).